Aug. 16, 1960  F. P. ALLES  2,949,296
SPLICING TAPE FEED MECHANISM
Filed April 22, 1958  2 Sheets-Sheet 1
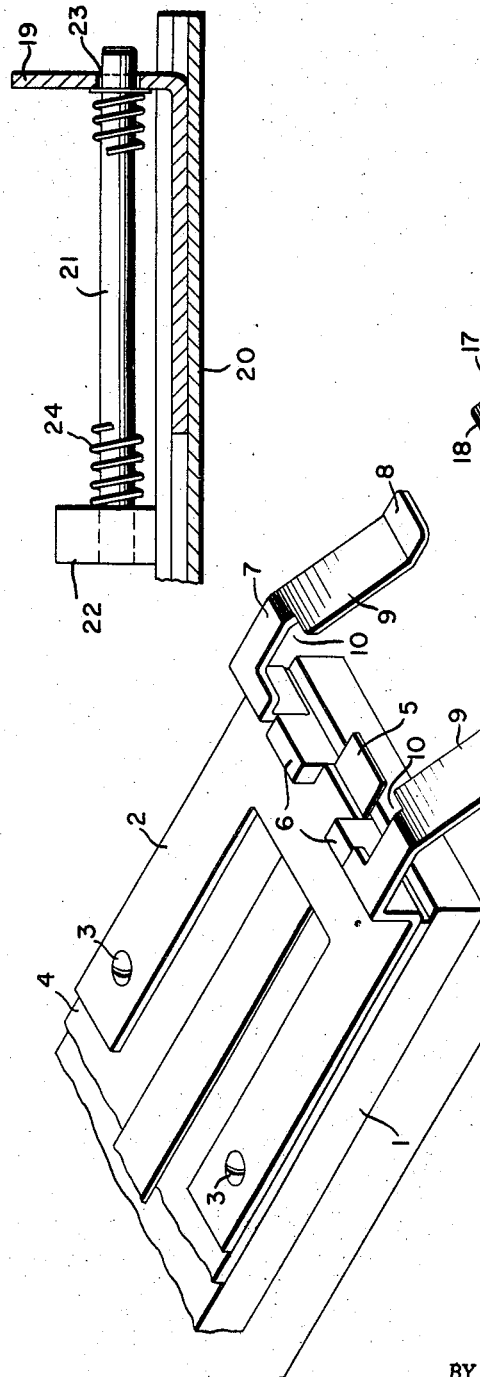
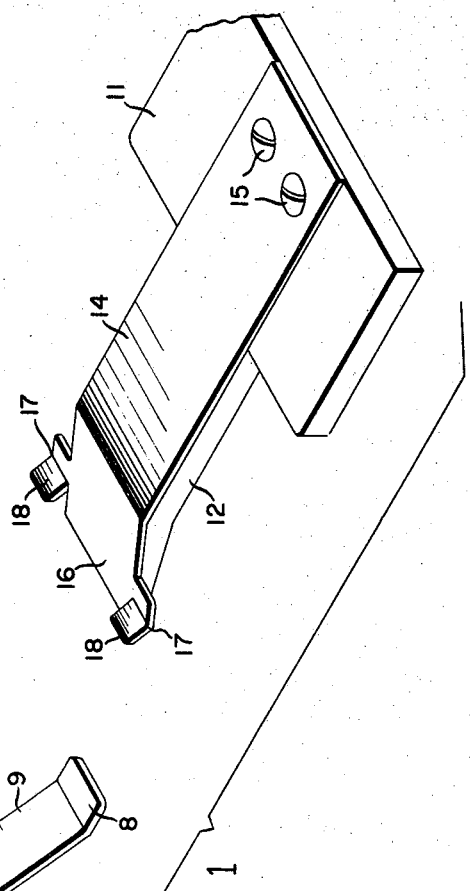
INVENTOR
FRANCIS PETER ALLES
BY John E. Griffiths
ATTORNEY

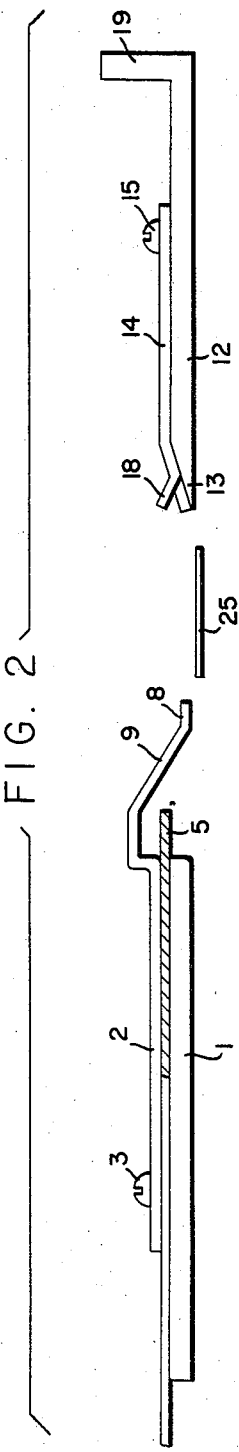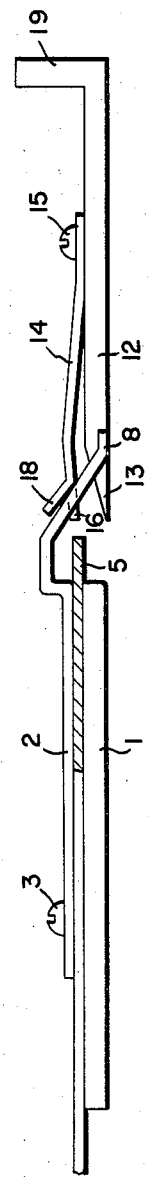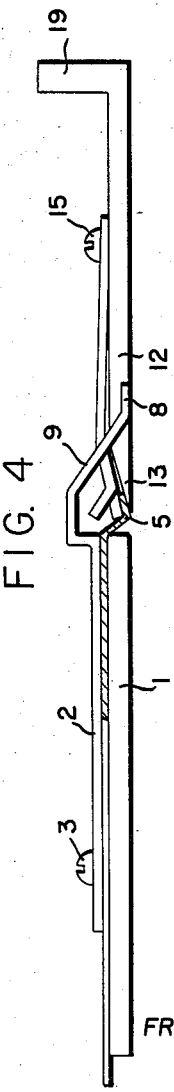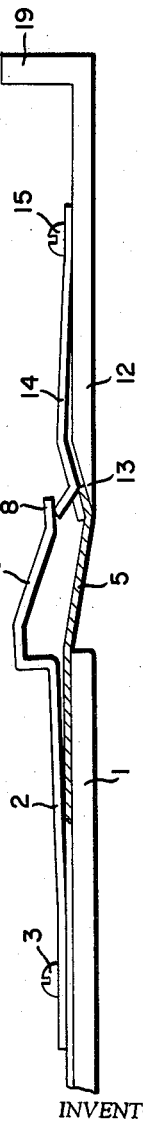

United States Patent Office 2,949,296
Patented Aug. 16, 1960

2,949,296

SPLICING TAPE FEED MECHANISM

Francis Peter Alles, Westfield, N.J., assignor to E. I. du Pont de Nemours and Company, Wilmington, Del., a corporation of Delaware Filed Apr. 22, 1958, Ser. No. 730,123

1 Claim. (Cl. 271—2.5)

This invention relates to a mechanism for feeding and positioning a continuous adhesive article in a splicing apparatus, such as an apparatus for the splicing of motion picture films.

A known method of splicing films such as photographic films, requires the use of a thermoplastic adhesive composition which is positioned in the desired location for splicing, followed by heating of the splicing joint under pressure to form a firm bond between the two films being joined.

As is known in the art, the adhesive composition used in such a splicing method can be in the form of a continuous article, such as a monofilament, a multifilament, a coating on a supporting fiber, a ribbon, or a coating on a tape or film. The heat and pressure required to form the splice can be applied by the use of conventional processes and apparatus.

In the use of such splicing apparatus, which can be, for example, of the dielectric heating or of the resistance heating types, it is desirable to feed a length of the thread, tape, or other continuous adhesive article into the splicing area, and position the length precisely where required for optimum results. For example, in lap splicing it is known to position the thread or tape between the overlapping ends of the two film sections to be joined. On the other hand, in butt splicing, it is known to position the tape or ribbon over the abutting ends of the two film sections being joined. After positioning the adhesive article in the desired location, the length required to form the splice can be separated as by cutting from the remainder of the continuous adhesive article.

This invention therefore has for its primary object the provision of a mechanism for feeding and positioning a continuous adhesive article within a splicing zone in a splicing apparatus.

It is believed that the apparatus of this invention can most readily be understood by reference to the accompanying drawings which constitute part of the present application, and in which similar reference numerals refew to similar parts throughout the several views, wherein Fig. 1 is a perspective view of one embodiment of the adhesive article feeding and positioning apparatus of this invention;

Figs. 2–5 are elevation details of one embodiment of the apparatus of this invention, illustrating the cooperating action of the various elements of the apparatus during the feeding and positioning of the adhesive article; and Fig. 6 is a side elevation view, partially schematic, illustrating a spring loaded mounting for an actuating handle in a preferred embodiment of the apparatus.

Referring now to the drawings, the feeding and positioning mechanism comprises, first referring to the element of the apparatus shown on the left in each of Figs. 1–5, a stationary block 1 having cooperatively mounted thereon leaf spring 2. Leaf spring 2 is secured by means of screws 3 to stationary block 1.

In the embodiment illustrated in Fig. 1, there is inserted between stationary block 1 and leaf spring 2 a guide 4 for a continuous adhesive article 5, the guide 4 having upright posts 6 which serve to guide therebetween, and direct the path of, the continuous adhesive article 5. As will be understood, upright posts 6 can be of any convenient structure, and it will be apparent that guide 4 can be an integral part of stationary block 1 and still serve the same useful purpose. Combined or separate, elements 1, 4 and 6 can be referred to as supporting and guiding means for introducing the continuous adhesive article in a path into the splicing zone.

Leaf spring 2, as will be understood, is fastened by screws 3 to the elements beneath it only at the rearward ends, thus permitting the leaf spring at its forward end to clamp the adhesive article 5 or to move slightly away from block 1 to release the adhesive article, as will be more fully understood from the following description.

Leaf spring 2 has forwardly projecting finger members 7 which terminate in lower ends 8 and have upper guiding surfaces 9. On their inner sides, the projecting finger members 7 have in their upper portions slots 10 which have critical minimum dimensions as will be later explained.

Referring now to that element of the apparatus illustrated in the right hand portion of Fig. 1, there can be seen sliding block 11 having secured thereto finger slide 12. Finger slide 12, as can best be seen in Figs. 2–5, terminates at its leading edge in forward tip portion 13.

Finger slide 12 has mounted on its upper surface leaf spring 14 which is secured at its rearward end to sliding block 11 by means of screws 15. Elements 11 and 12 can of course constitute a single member. Leaf spring 14 has a forward edge 16 which serves to coact with forward tip portion 13 of the finger slide 12. Leaf spring 14 also has protruding side wings 17 which in turn have at their leading edge upwardly extending fingers or projection pieces 18. Since, as can be understood by reference to Figs. 2–5, the two primary elements of this adhesive article feeding and positioning means are adapted for relative motion to and from each other, this motion can be conveniently applied manually by means of handle 19. The elements 11 and 12 can conveniently slide on rails 20 or other suitable elements.

In a preferred embodiment, partially illustrated in Fig. 6, movement of handle 19 towards the left along rod 21, which is secured at one end in fixed mount 22 and is guided at its other end through hole 23 in the handle 19, causes compression of spring 24. Subsequent release of handle 19 and action of the spring effects a return of the handle to its initial position.

Operation of the device of this invention serves to take the leading end of the adhesive article 5 from the supporting and guiding means on the left, carry the adhesive article into the splicing zone into proper splicing position laterally across the desired surface of film 25 to be spliced. This is accomplished by gripping the leading edge of the article 5 between forward tip portion 13 and forward edge 16 of the right hand structural element. Subsequent cutting of the adhesive article leaves the desired length in the splicing zone for carrying out the actual splicing operation, as will be understood.

The film 25 to be spliced is positioned as shown in Fig. 2, or in the case of lap splicing the top film section is positioned conventionally over the adhesive, and operation of the device of this invention can then be carried out.

In operation, the elements of the present apparatus are suitably mounted on film splicing apparatus, which can be of the dielectric heating, resistance heating, or other types.

Referring in sequence to Figs. 2–5, movement of the right hand element including finger slide 12 towards the left hand element including block 1 can be accomplished manually by means of handle 19. After suitable sliding motion, contact is made between the leading portions of the left hand and right hand elements. Since wings 17 project a greater width than the distance between projecting finger members 7, upwardly extending fingers or projecting pieces 18 will touch upper guiding surface 9 and be urged in an upward direction, as best illustrated in Fig. 3. Since finger slide 12 is narrower than the distance between finger members 7, finger slide 12 with its forward portion 13 continues to advance between the projecting finger members 7. It can be seen that in this position the forward edge 16 has separated from the forward tip portion 13 in the manner of grippers or jaws, ready and poised to grasp whatever is placed therebetween. The upward camming action of guiding surfaces 9 continues to spread the jaws, i.e., forward tip portion 13 further from forward edge 16, until wings 17 reach slots 10. At this latter position, because wings 17 are smaller than the dimensions of slide 10, the wings fall through the slots due to the leaf spring action of element 14, causing the jaws to grasp securely the leading portion of the adhesive article 5 which had been waiting in proper position for this action.

Withdrawal of the right hand element, either manually or by action of compression spring 24, is now ready to take place. As can be seen, wing portions 17 will rather promptly contact the undersurfaces of projecting finger members 7 and exert a force against them. Since leaf spring 14 is firmly held against downward motion by finger slide 12, and since finger members 7 integral with leaf spring 2 are capable of upward motion due to the flexible nature of element 2, urging of wings 17 in a rearwardly (rightwardly) direction against finger members 7 serves to separate leaf spring 2 from its clamping position against the supporting and guiding means 1 and 4, thus releasing the adhesive article 5 for free movement in its path towards the right.

The clamping of the leading end of the adhesive article is most clearly illustrated in Fig. 4, whereas the withdrawal of the right hand element and its camming action on finger members 7 can be most clearly seen in Fig. 5. Return of finger slide 12 to its starting position will cause the adhesive article to be positioned in its predetermined location as desired. Cutting on the adhesive article, as will be understood, by any suitable means, will leave the portion of the article required by splicing suitably positioned with respect to the film 25, and at the same time will leave a new leading end of the adhesive article suitably positioned for grasping between forward tip portion 13 and forward edge 16 in the next cycle of operation of this device.

It will be understood that, although the above description has been specifically with respect to the attached drawings, various modifications can be made without departing from the scope and spirit of this invention. It will be understood, for example, that the motion between the left hand and right hand elements could be changed with the right hand element remaining stationary and motion applied to the left hand element, such as on rails or other suitable means. It is also possible to have only one projecting finger member on the left hand element and one corresponding wing portion on the right hand element, but this embodiment is less preferred.

The apparatus of this invention has the advantages that it is compact, simple to operate, inexpensive to manufacture, composed of rugged, inexpensive, easily replaceable components, easily adapted to conventional splicers, and that it assists in the rapid, ready and uniformly reproducible splicing of films. Still other advantages will be apparent from the above description of the invention.

I claim:

In a mechanism for feeding and positioning a continuous adhesive article in a splicing apparatus, the combination comprising on the one hand, (1) supporting and guiding means for introducing said adhesive article in a path into a splicing zone, and a first leaf spring secured to said supporting and guiding means, said first leaf spring mounted to releasably clamp said adhesive article, said first leaf spring having two finger members one on each side of the path of said adhesive article and projecting forwardly into said splicing zone, said finger members each having a slot on its side adjacent said path and having a guiding surface extending downwardly into said splicing zone, and, on the other hand, (2) a block member having a tapered forward tip portion, and a second leaf spring secured to said block member and in close, continuous contact therewith, said second leaf spring being of narrower width than the distance between said two finger members and mounted to releasably grasp said adhesive article between said block member and said second leaf spring, said second leaf spring having projecting wing portions one on each side, said wing portions projecting wider than the distance between said two finger members and of smaller dimensions than said slot, said block member being capable of reciprocating motion in the direction of said path and so positioned with respect to said supporting and guiding means whereby, (a) upon relative motion of said block member towards said supporting and guiding means, said wing portions are guided upwardly by said guiding surface, raising the said second leaf spring from contact with the forward tip portion of said block member, until reaching and dropping through said slots, whereupon said second leaf spring coacts with said block member to grasp firmly therebetween said adhesive article, and, (b) upon subsequent relative motion of said block member away from said supporting and guiding means, said wing portions by pushing upwardly against said finger members effect separation of said first leaf spring from said supporting and guiding means, thereby releasing said adhesive article from between said first leaf spring and said supporting and guiding means, and, (c) at the completion of said subsequent relative motion of said block member, said adhesive article remains firmly grasped by said second leaf spring and said block member at one end and between said first leaf spring and said supporting and guiding means at the other end.

References Cited in the file of this patent

UNITED STATES PATENTS

| | | |
|---|---|---|
| 1,025,418 | Morrison | May 7, 1912 |
| 1,940,154 | Sylva | Dec. 13, 1933 |